(12) United States Patent
Stewart (10) Patent No.: US 8,743,197 B2
(45) Date of Patent: Jun. 3, 2014

(54) SYSTEM AND METHOD FOR MONITORING JUMP VELOCITY

(76) Inventor: David James Stewart, Zephyr Cove, NV (US)

( * ) Notice: Subject to any disclaimer, the term of this patent is extended or adjusted under 35 U.S.C. 154(b) by 1109 days.

(21) Appl. No.: 12/413,072

(22) Filed: Mar. 27, 2009

(65) Prior Publication Data

US 2010/0123777 A1 May 20, 2010

Related U.S. Application Data

(63) Continuation-in-part of application No. 29/317,028, filed on Apr. 22, 2008.

(60) Provisional application No. 61/115,329, filed on Nov. 17, 2008.

(51) Int. Cl.
*H04N 7/18* (2006.01)
*H04N 9/47* (2006.01)

(52) U.S. Cl.
USPC ............................. 348/143; 348/77; 348/157

(58) Field of Classification Search
USPC ........................................................ 348/143
See application file for complete search history.

(56) References Cited

U.S. PATENT DOCUMENTS

| | | | |
|---|---|---|---|
| 3,505,878 A | 4/1970 | Moll | |
| 4,089,057 A * | 5/1978 | Eriksson | 702/158 |
| 4,262,537 A | 4/1981 | Jander et al. | |
| 4,546,650 A | 10/1985 | Cameron | |
| 4,911,005 A * | 3/1990 | Heyn et al. | 73/187 |
| 5,003,820 A | 4/1991 | Dittbrenner | |
| 5,951,357 A * | 9/1999 | Mandle et al. | 446/138 |
| 6,320,515 B1 * | 11/2001 | Olsson | 340/905 |
| 6,433,691 B1 * | 8/2002 | Hilliard et al. | 340/573.1 |
| 6,533,296 B1 | 3/2003 | Farraday | |
| 6,718,058 B2 | 4/2004 | Ochi et al. | |
| 7,040,994 B2 * | 5/2006 | Lochtefeld et al. | 472/117 |
| 7,414,528 B2 | 8/2008 | Crichton | |
| 7,617,069 B2 * | 11/2009 | Alexander et al. | 702/141 |
| 7,860,666 B2 * | 12/2010 | Vock et al. | 702/44 |
| 2002/0052236 A1 | 5/2002 | Kohira et al. | |
| 2003/0016160 A1 * | 1/2003 | Lok et al. | 342/33 |
| 2003/0055595 A1 * | 3/2003 | Flentov et al. | 702/142 |
| 2003/0069052 A1 | 4/2003 | Higashiyama et al. | |
| 2004/0075737 A1 * | 4/2004 | Kirby | 348/135 |
| 2006/0167649 A1 * | 7/2006 | Alexander et al. | 702/160 |

(Continued)

*Primary Examiner* — Ario Etienne
*Assistant Examiner* — Blake Rubin
(74) *Attorney, Agent, or Firm* — Michael A. Kerr; Kerr IP Group, LLC (57) ABSTRACT

A jump safety system for communicating an optimal velocity for a jump is described. The system includes a radar component, a memory, a processor, a velocity processing module, an increase velocity status, a decrease velocity status, a maintain velocity status, and a light emitting component. The radar component transmits and receives radio signals and generates a velocity output. Additionally, the radar component is positioned to determine velocity along a path associated with the jump. The velocity processing module is controlled by the processor and determines an optimal velocity range for a landing area. The maintain velocity status determined by the velocity processing module indicates the velocity output. The light emitting component is configured to communicate at least one of the increase velocity status, the decrease velocity status, or the maintain velocity status.

26 Claims, 6 Drawing Sheets

(56) References Cited

U.S. PATENT DOCUMENTS

| | | |
|---|---|---|
| 2006/0187019 A1* | 8/2006 | Crichton ............... 340/523 |
| 2007/0026974 A1 | 2/2007 | Marty et al. |
| 2007/0032318 A1* | 2/2007 | Nishimura et al. ......... 473/570 |
| 2008/0027599 A1* | 1/2008 | Logan et al. ............ 701/23 |
| 2009/0040301 A1 | 2/2009 | Sandler et al. |
| 2009/0066490 A1 | 3/2009 | Mitzutani et al. |
| 2010/0148483 A1 | 6/2010 | Kopp et al. |
| 2010/0160014 A1* | 6/2010 | Galasso et al. ............ 463/6 |
| 2010/0197416 A1 | 8/2010 | Brown |
| 2010/0318294 A1* | 12/2010 | Rosing et al. ............ 701/220 |
| 2011/0071792 A1 | 3/2011 | Miner |
| 2011/0131012 A1 | 6/2011 | Czaja et al. |
| 2011/0267189 A1 | 11/2011 | Stewart |

* cited by examiner

SYSTEM AND METHOD FOR MONITORING JUMP VELOCITY

CROSS REFERENCE TO RELATED APPLICATIONS

This application Ser. No. 12/413,072 is a continuation-in-part of Design patent application No. 29/317,028 filed Apr. 22, 2008, and this application Ser. No. 12/413,072 is related to Provisional Patent Application 61/115,329 filed Nov. 17, 2008. This application is also related to co-pending Non-provisional patent application Ser. No. 12/412,946 entitled SYSTEM AND METHOD FOR MONITORING A JUMP LANDING AREA, filed Mar. 27, 2009. All applications listed in this paragraph are hereby incorporated by reference.

FIELD OF THE INVENTION

This invention relates to a jump safety system and method for monitoring jump velocity. More particularly, the system and method communicates an optimal velocity for a jump by communicating a velocity status and/or a velocity measurement.

BACKGROUND

Snow sports such as skiing and snowboarding are popular sports with continuously evolving technology and practices. One common activity in snow sports is taking a "jump." To use a jump, the rider approaches the jump area at high speed. The rider leaves the snow at the edge or lip of the jump, continues through the air, and ideally lands in the "landing area." The landing area is a sloped surface designed to minimize impact force upon landing. A jump area generally comprises an angled jump where the rider actually leaves the snow, the tabletop or gap, the landing area, and the run-out area.

The jump may be part of ski run or in a terrain park. A terrain park is an area of a snow resort that includes designed features analogous to a skate park, allowing skiers, snowboarders and the like (referred to as "riders") to perform tricks including grinds, taps, and jumps in a similar fashion to skateboarders.

There are hazards associated with the use of jumps. One is that the landing area is not usually visible from the lip of the jump. Additionally, obstructions in the landing area pose a high risk of injury to the rider, who cannot substantially adjust jump trajectory after leaving the surface of the snow.

The most common obstructions found in the landing area are spectators and other riders. Sometimes uninformed people wander into the landing area because they simply do not understand the safety risk they are posing to themselves and to others. Other times a rider may be too injured to clear the landing area quickly, or at all.

One solution to this problem is to use a spotter. A spotter is a person who stands near the jump in such a way as to see whether there are obstructions in the landing area and signals to waiting riders to go when the area is clear. However, while many resorts provide terrain parks with jumps, few provide spotters for jumps. An automated system that can detect the presence of people and other obstructions in the landing area and convey that information to waiting riders is needed.

Another hazard associated with jumps is speed. If the rider is not moving at an appropriate speed when airborne, the rider may land in an area other than the landing area. If the rider is moving too slowly, the jump may not be 'cleared', resulting in the rider missing the landing area short and instead landing in the tabletop or gap area. If the rider is moving too fast, the jump may extend past the sloped landing area, causing the rider to land in the flatter run-out area. Landing in either of these areas subjects the rider's body to much higher impact forces than landing in the appropriately sloped area. It is largely left to the rider's experience to determine whether a given speed is safe for a given jump.

Several U.S. patents, including U.S. Pat. Nos. 3,505,878; 4,546,650; 5,003,820; 6,533,296; and 4,262,537 disclose ski-mounted devices that can measure speed, but these systems cannot effectively convey information in real time because the displays are mounted on the ski device or on the rider, making them difficult, and perhaps even dangerous, to view while actively skiing or snowboarding. Further, these systems do not provide information about an optimal speed range in relation to a jump.

In U.S. Pat. No. 7,414,528, an automated system for improving skier safety is described. This system signals whether a previous skier has failed to leave the landing area, but it does not convey information about other obstructions or hazards that may be present in the landing area. Further, this system does not detect people that have wandered into the jump landing area from an area other than the location of the jump.

SUMMARY

A jump safety system for communicating an optimal velocity for a jump is described. The system comprises a radar component, a memory, a processor, a velocity processing module, a velocity measurement, and a light emitting component. The radar component transmits and receives radio signals and generates a velocity output. Additionally, the radar component is positioned to determine velocity along a path associated with the jump. The memory records the velocity output, and the processor is configured to analyze the velocity output. The velocity processing module is controlled by the processor and determines an optimal velocity range for a landing area. The landing area has a declining sloped angle that reduces a landing force in relation to the slope angle. The velocity processing module indicates that the measured velocity. The light emitting component is configured to communicate the velocity measurement.

In one illustrative embodiment, the components of the system for communicating an optimal velocity for a jump are mounted in a housing or frame. Also mounted to the frame is a surface gliding system that allows the frame to be moved easily over snow-covered surfaces and a surface stabilization system that allows the frame to be fastened into the snow. In this embodiment, the radar component is mounted on the housing and points to a path associated with the jump. In another illustrative embodiment, the system includes a velocity means such as a camera that determines the rider's velocity.

The method includes positioning the velocity means along a path associated with a jump and selecting an optimal velocity range for the landing area. The method proceeds to record the velocity output and analyze the velocity output.

DRAWINGS

The present invention will be more fully understood by reference to the following drawings which are for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and apparatus described hereinafter may vary as to configuration and as to details. Additionally, the methods may vary as to details, order of the actions, or other variations without departing from the illustrative methods disclosed herein.

A jump safety apparatus, system and method are described. The jump safety apparatus, system and method include either a monitoring jump landing area component, a monitoring jump velocity component, or a combination thereof. The monitoring jump landing area component monitors a jump landing area for obstructions in an automated real-time manner. The monitoring jump velocity component communicates whether the rider has achieved a satisfactory jump velocity. The system for monitoring the jump landing area can operate independently of the system for monitoring a jump velocity, or the systems may operate in an integrated fashion. The illustrative embodiments described below present a single housing embodiment that includes either the monitoring landing area systems, or the monitoring jump velocity systems, or the combination thereof.

Figure 1:
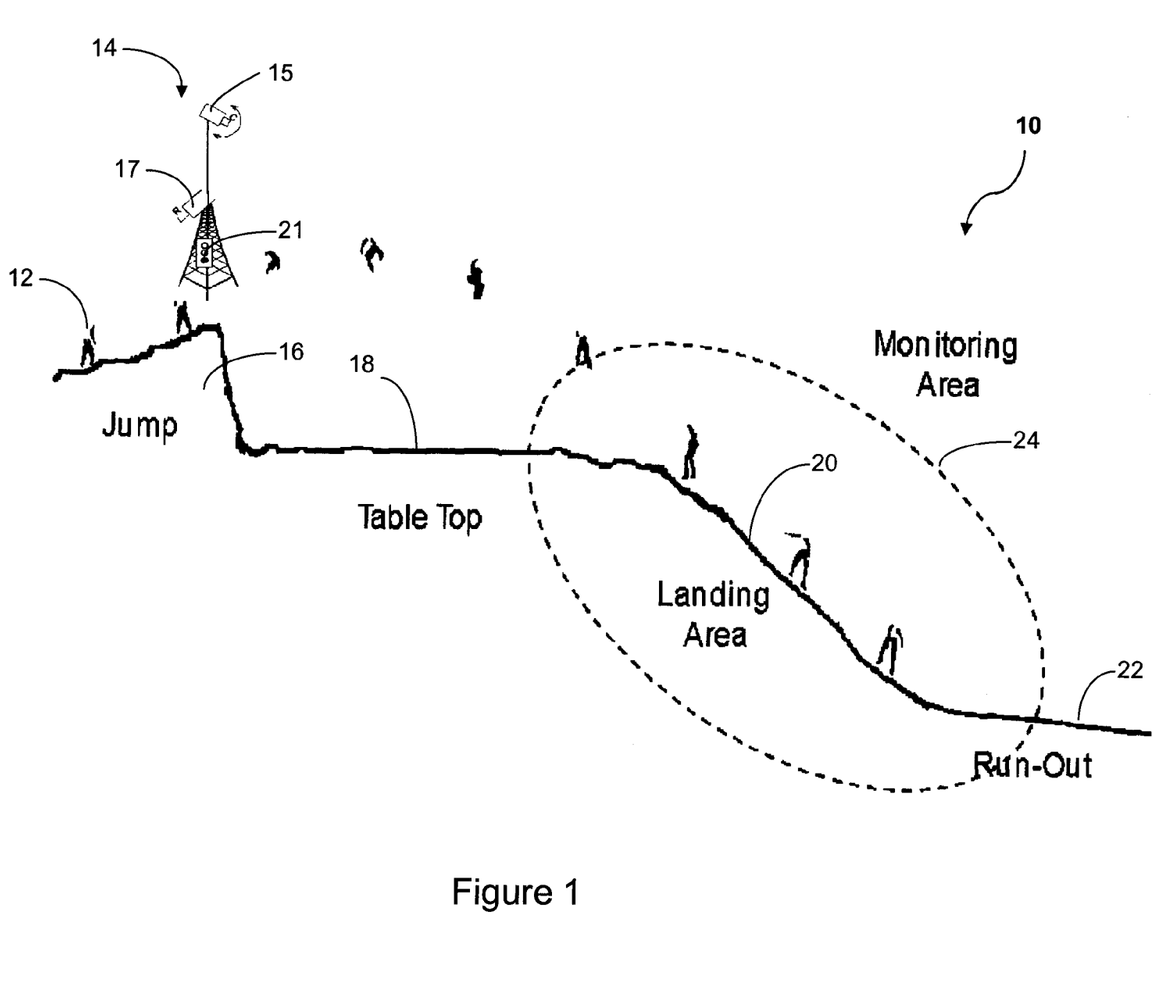
FIG. 1 shows a side view of a jump illustrating the parts of a jump and a monitoring area.

Referring to FIG. 1, there is shown a side view of a jump illustrating the parts of a jump and the monitoring area. The side view of a typical jump area 10 includes a rider 12 and an illustrative jump safety apparatus 14. The illustrative jump safety apparatus 14 includes either a monitoring jump landing area component represented by a camera 15, a monitoring jump velocity component represented by a radar component 17, or a combination thereof.

In FIG. 1, the rider 12 approaches the jump 16 and increases velocity along a path that leads up to the jump. The illustrative jump safety apparatus 14 is placed near the jump 16 in such a way that camera 15 is elevated and has a view of a landing area 20. The light emitting output 21 is visible to riders as they approach the jump.

There are various parts to jump area 10. The jump 16 includes an angled portion of the jump area where the rider breaks contact with the snow and becomes airborne. A table top 18 is adjacent to the jump and provides a relatively flat area that precedes a landing area 20. The landing area 20 is the zone where rider 12 typically makes contact with the snow after a successful jump. A run-out area 22 that is adjacent the landing area is where riders slow down after a jump.

An illustrative monitoring area 24 depicts the area being monitored and analyzed by the monitoring jump landing area system. As depicted in the drawing, the monitoring area includes all or part of the landing area and may also include portions of the tabletop or run-out areas.

Figure 2:
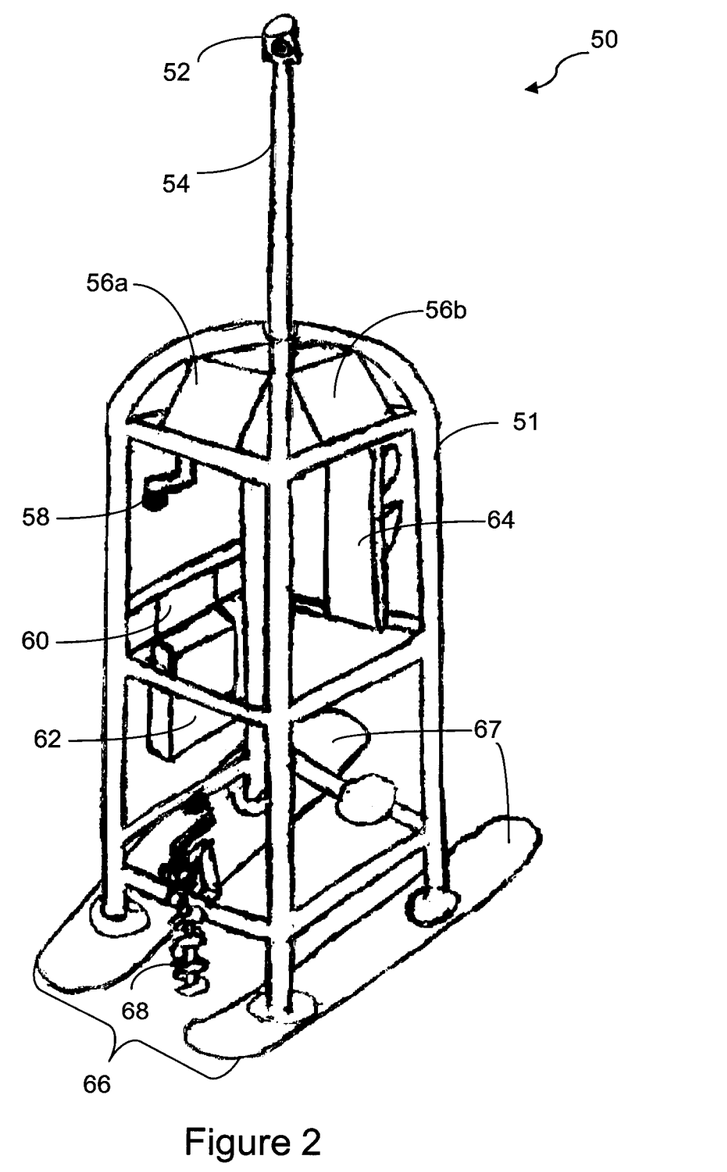
FIG. 2 shows an isometric view of an illustrative jump safety apparatus having an integrated housing.

Referring to FIG. 2, there is shown an isometric view of an illustrative jump safety apparatus having an integrated housing. The illustrative jump safety apparatus 50 includes an integrated weatherproof housing 51 having mounted thereon either the monitoring jump landing area component 15, or monitoring jump velocity component 17, or the combination thereof.

The illustrative monitoring jump landing area component 15 includes a camera 52 mounted on the weatherproof housing 51 atop a mounting pole 54 that is extensible using hand crank 58. In operation, hand crank 58 can be turned manually to raise pole 54, allowing the camera to be positioned at a high vantage point to gain a better view of the monitoring area.

Additionally, the monitoring jump velocity component 17 generates or determines a measured velocity. The monitored jump velocity component 17 may be mounted on the integrated weatherproof housing 51. By way of example and not of limitation, a velocity means such as a radar component may be used to generate a velocity output that provides a velocity along a path associated with the illustrative jump 16. The velocity output may also be referred to as the measured velocity.

In one embodiment, the velocity measurement is communicated using a light emitting component or other such means for communicating the velocity. In another embodiment, the velocity measurement is communicating with an increase velocity status determined by the velocity processing module having the velocity output below the optimal velocity range, a decrease velocity status determined by the velocity processing module having the velocity output above the optimal velocity range, and a maintain velocity status determined by the velocity processing module having the velocity output within the optimal velocity range. In yet another embodiment, the velocity measurement is communicated by providing an actual velocity or measured velocity output, the increase velocity status, the decrease velocity status, the maintain velocity status, or any combination thereof.

The illustrative radar component (not shown) can be mounted on the weatherproof housing 51 in a manner similar to camera 52. Thus, the radar component may be coupled to a mounting pole 54 that is extensible using hand crank 58. Alternatively, the radar component may be fixedly coupled to the weatherproof housing 51, without having to be fixedly coupled to the mounting pole 54.

The illustrative jump safety apparatus 50 with the integrated housing also includes a local power supply that delivers power to either the monitoring landing area component 15, or the monitoring jump velocity component 17, or the combination thereof. The illustrative power supply may include solar panels 56 that are mounted around the top of the frame beneath the camera 52 and mounting pole 54. The illustrative solar panels 56 supply the operating power for all powered components in this energy-efficient embodiment. The solar power supply also may include a battery back-up system 62 that is capable of providing power to the system for 8-12 hours.

In this illustrative embodiment, the camera is operatively coupled to a camera aiming system that includes a weatherproof LCD screen 60. The screen 60 displays the output of camera 52 and aids the user in establishing or correcting the monitoring area that is analyzed using camera 52. By way of example and not of limitation, beneath the screen is a computer housing 62 that includes a microprocessor and memory and battery back-up system. The computer housing may include a "Tiny PC", which refers to the PC being both compact in size and solid state. The computer housing 62 is also mounted in a weatherproof housing and is communicatively coupled to the camera 52 by Ethernet cable, USB connection, or any other video to PC capture device. The computer housing 62 is also communicatively coupled to a light emitting output 64. In this illustrative embodiment, the light emitting output 64 is an energy-efficient LED stoplight style display signal.

A surface positioning component 66 is mounted on the bottom of the integrated weatherproof housing 51. The surface positioning component 66 enables the jump safety apparatus 50 to be moved easily over snow and placed into a particular position for use. In this illustrative embodiment, the surface positioning component 66 includes a pair of skis 67 and snow screw 68. Once maneuvered into the desired position to monitor the jump, surface positioning component 66 allows the jump safety apparatus 50 to be firmly fastened into place with the snow screw 68.

An alternative to the surface positioning system 66 would be a fixed station as shown in FIG. 1 that is not movable. The fixed station may be camouflaged as a tree or other such stationary object and includes each of the elements of the jump safety apparatus described herein.

Figure 3:
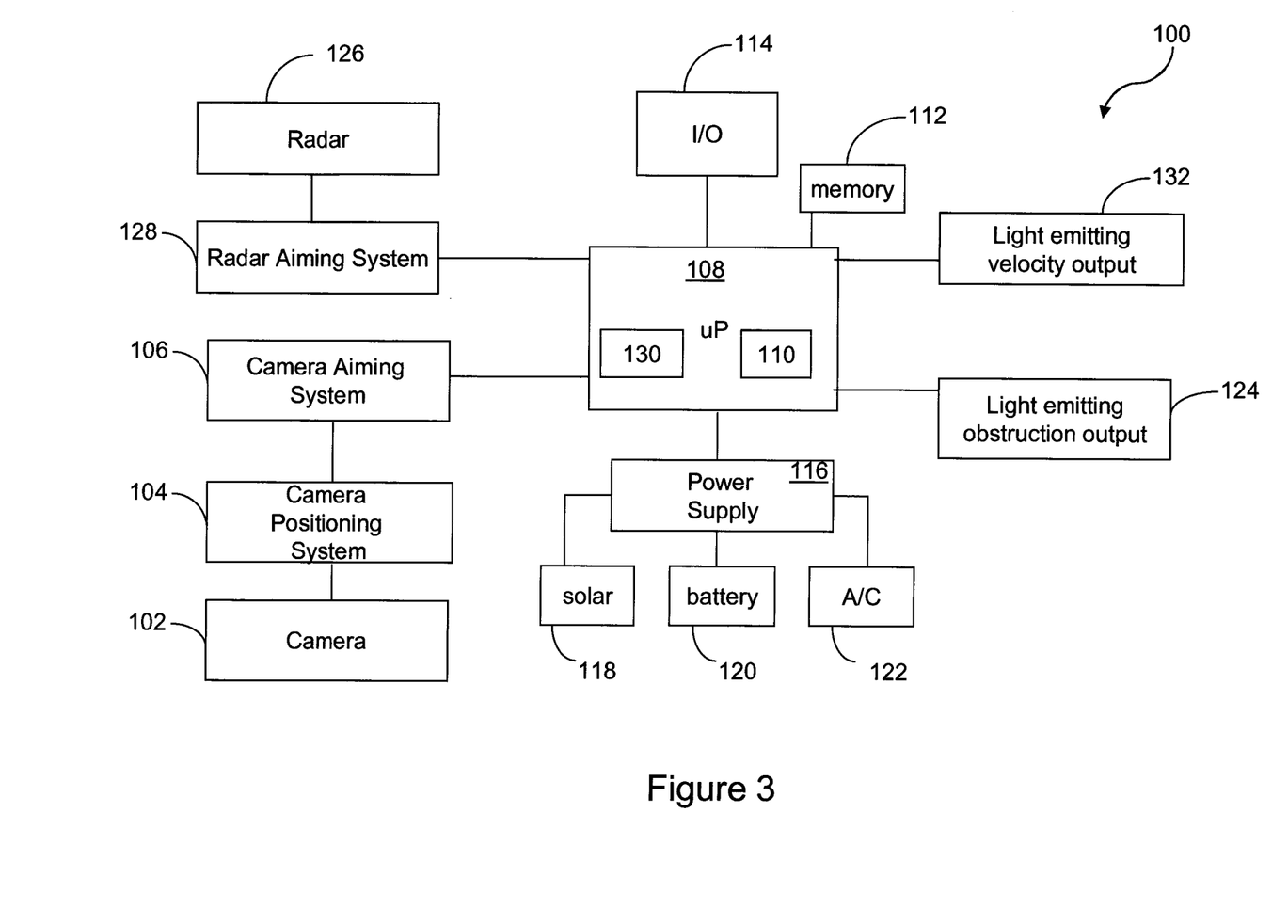
FIG. 3 shows a jump safety system diagram for monitoring a landing area and monitoring a jump velocity.

Referring to FIG. 3 there is shown a jump safety system diagram for monitoring either the landing area, or the jump velocity, or the combination thereof. The jump safety system 100 includes a camera 102 such as a weatherproof camera that can stream live video. The camera positioning module 104 is operatively coupled to the camera 102 and controls camera movement, including performing pan, tilt, and zoom functions. Additionally, the camera positioning module 104 may be configured to control camera altitude on mounting pole 54 by controlling a motor (not shown) that can move the mounting pole 54 to the desired elevation.

A camera aiming module 106 is operatively coupled to the camera 102 and the camera positioning system 104. The camera aiming module 106 aims and focuses the camera 102 on a user-defined monitoring area 24 shown in FIG. 1. In one illustrative embodiment, the camera aiming module 106 uses laser pointers mounted on or near the camera to delineate the corners of the monitoring area on the snow. The camera aiming module 106 may also provide an LCD screen output that is capable of displaying the camera output and enables a user to select a user-defined monitoring area, e.g. a window, within the display.

In the illustrative embodiment, the camera 102, camera positioning module 104 and camera aiming module 106 are separate components that are communicatively coupled to microprocessor 108. Alternatively, the microprocessor 108 may be configured to perform the operations of the camera positioning module 104 and the camera aiming module 106, enabling the camera 102 to simply be connected to a PC having a microprocessor 108.

The illustrative processor 108 is configured to also have an image processing module 110. The image processing module 110 determines if the landing area is clear of obstructions by providing a landing area clear status or a landing area obstruction status. The landing area clear status indicates that the landing area is clear of obstructions. The landing area obstruction status indicates that there is an obstruction in the landing area. The image processing module 110 may be programmed using MATLAB® or other such image processing software that enables the monitored area 24 to be analyzed on a real-time basis to determine whether or not there is an obstruction in the monitoring area 24. Image processing techniques may include, but are not limited to, examining the image for a high concentration of closely grouped pixels with color saturation above a pre-selected threshold. Analysis techniques may also include comparing average light intensity between images.

A plurality of input/output (I/O) devices 114 are also communicatively coupled to the microprocessor 108. For example, one of the I/O devices 114 may include a touch screen LCD screen that enables the user to manually configure monitored landing areas surrounding areas of the jump site. Another illustrative I/O device 114 may be a keyboard that can be used to change user-selectable parameters associated with image processing module 110.

In the illustrative jump safety system 100, system power is supplied by power supply 116. In the illustrative embodiment, a solar power supply 118 and a battery backup 120 are employed. In another embodiment, the jump safety system 100 is capable of being powered by AC source 122. By way of example and not of limitation, the battery backup 120 is capable of supplying power for 8-12 hours when inclement weather may prevent the solar panels from supplying power for an extended period. The system power can be routed through the microprocessor 108 or power can be provided to each component separately. Means for remote monitoring of power supply status may also be associated with the power supply 116.

A light emitting output 124 is communicatively coupled to microprocessor 108 using a serial cable, USB, or any other PC compatible interface that allows transmission of signal status from the PC to the light emitting output 124. The light emitting output 124 communicates the current status of the monitored area based on the image analysis using the image processing techniques described above. If the image processing module 110 determines that the landing area is clear of obstructions, then a "Go" signal, e.g. green light, is communicated by the light emitting output 124. If the determination is made that there is an obstruction in the landing area, a "Stop" signal, e.g. red light, is communicated by the light emitting output 124. By way of example and not of limitation, the illustrative light emitting output 124 may be similar to a traffic light having a green signal light indicating "go" and a red signal light indicating "stop."

Additionally, there may be a landing area caution status that indicates that there may be an obstruction in the landing area. The landing area caution status may be indicated with an orange light indicating "caution." The caution status may be triggered by a variety of conditions such as poor weather visibility, changes to snow, an icy landing area, and other such instances that may trigger a caution status.

The jump safety system 100 is also configured to communicate an optimal velocity for a jump to a rider with a monitoring jump component system 17. The monitoring jump component includes a means for determining velocity such as a radar component 126. The radar component 126 transmits and receives radio signals and generates a velocity output. Additionally, the radar component 126 is positioned to determine velocity along a path associated with the jump. Radar aiming system 128 aims the radar gun along a path corresponding to the approaching riders.

In operation, the radar data from the radar component 126 is captured and stored in memory 112, which records the velocity output. The processor 108 is configured to analyze the velocity output with a velocity processing module 130.

The velocity processing module 130 is controlled by the processor 108 and an optimal velocity range for a particular landing area is determined. If a velocity is within the optimal range, the velocity processing module 130 determines that the velocity has a maintain velocity status. If a velocity is lower than the bounds of the optimal range, the velocity processing module 130 indicates an increase velocity or 'too slow' status. If a velocity is higher than the bounds of the optimal range, the velocity processing module 130 indicates a decrease velocity or 'too fast' status. Thus, an increase velocity status is associated with a velocity that is too slow and thus the rider must speed up to reach the optimal velocity range for the jump, and a decrease velocity status is associated with a velocity that is too fast and thus the rider must slow down to reach the optimal velocity range for the jump.

A separate light emitting output 132 is communicatively coupled to microprocessor 108 using a serial cable, USB, or any other PC compatible interface that allows transmission of signal status from the PC to the light emitting output 132. The light emitting output 132 communicates the current status of the approaching rider's velocity. The light emitting output may be configured in one of many similar ways, as described below. Generally, a combination of symbols, colors, phrases, and/or other visual signals (display flashing or changing color, for example), may be used to communicate the current velocity status to the rider. The display may be set to communicate the speed information directly to the rider.

If an increase velocity status is indicated by the velocity processing module 130, an increase velocity signal is communicated by the light emitting output 132. The increase velocity signal may be indicated using a symbol such as an upward arrow, a red upward arrow, and/or a red plus sign. The increase velocity signal may also be indicated using phrases such as "SPEED UP" and/or "TOO SLOW." The display may also flash at varying speeds or change colors to indicate that velocity status is approaching the optimal range or is about to drop into the sub-optimal range.

If a decrease velocity status is indicated by the velocity processing module 130, a decrease velocity signal is communicated by the light emitting output 132. The decrease velocity signal may be indicated using a symbol such as a downward arrow, a red downward arrow, and/or a red minus sign. The decrease velocity signal may also be indicated using phrases such as "SLOW DOWN" and/or "TOO FAST." The display may also flash at varying speeds or change colors to indicate that velocity status is approaching the optimal range or is about to exceed optimal range.

Additionally, there may be a velocity caution status that indicates that there is a particular challenge associated with determining the rider's velocity. The velocity challenge may be indicated with an orange light indicating "caution." The caution status may be triggered by a variety of conditions such as poor weather visibility, an inability to determine rider velocity, and other such instances that may trigger a caution status.

In the illustrative embodiment, the light emitting output 132 comprises an LCD or LED or similar type of display that is capable of displaying characters in at least two colors, such as red and green. The light emitting display 132 will display the rider's speed in one color (green in this illustrative embodiment) if the rider's velocity is within the optimal range. If the rider's speed is above the optimal range, the numbers on the display will turn another color (red in this illustrative embodiment), and an arrow will display next to the velocity readout to indicate the proper course of action to the rider, in this case, a downward arrow meaning "slow down." Similarly, if the rider's speed is below the optimal range, the velocity readout display will also be red, but the arrow will point upward to indicate that the rider needs to speed up. The arrows will flash slowly if the rider's speed is close to optimal, and will flash more quickly as the magnitude of the difference between the rider's speed and the optimal velocity range increases.

Figure 4:
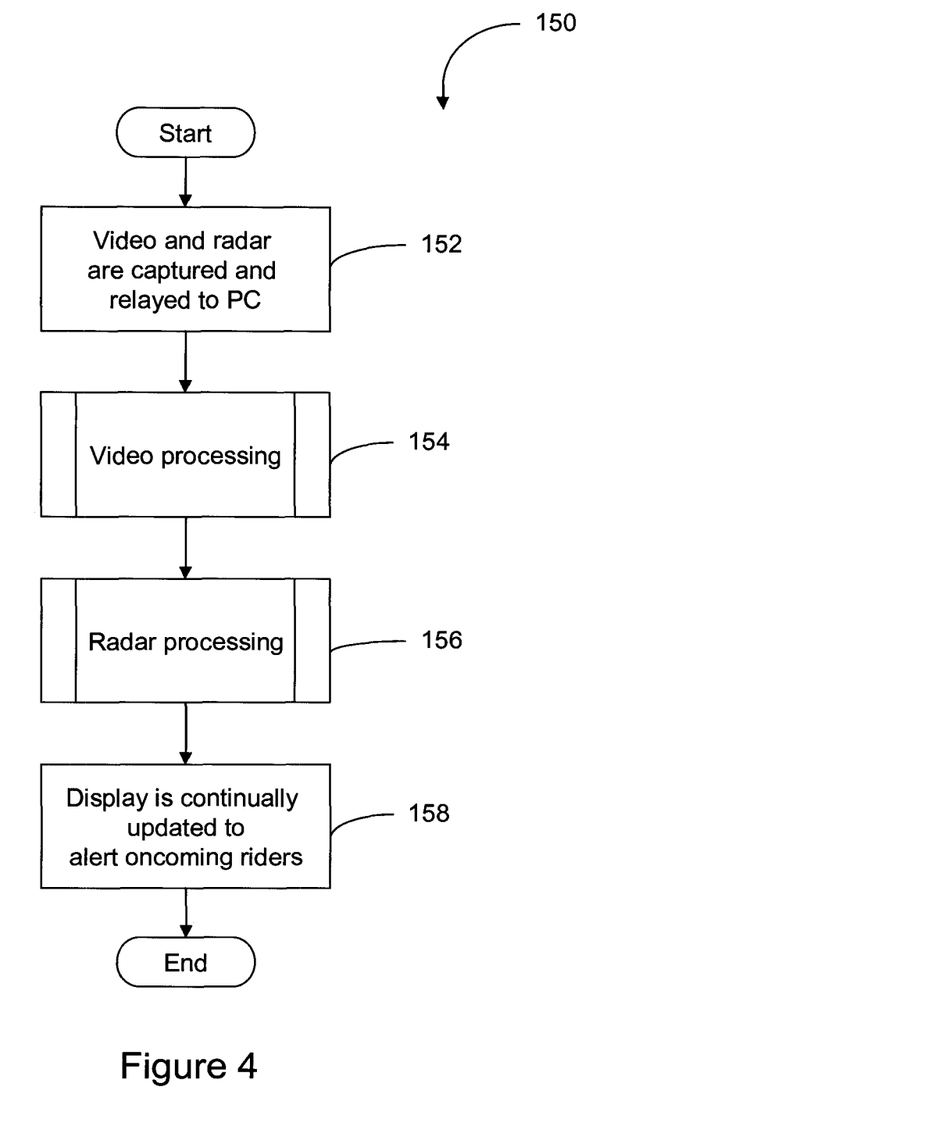
FIG. 4 presents a high-level flow chart of a method for performing the system operations described in FIG. 3.

Referring to FIG. 4 there is shown a high-level flow chart of a method for performing the system operations described in FIG. 3. The method 150 is initiated at block 152 where either video from camera 102, or velocity information from radar 126, or the combination thereof is captured by the jump safety system 100.

In one embodiment, the method 150 then proceeds to block 154 where video data is processed to monitor the landing area associated with the jump. The jump safety method comprises positioning the camera 120 to display the landing area associated with the jump. As previously described, the landing area has a declining sloped angle that reduces a landing force in relation to the slope angle. The illustrative operations within block 154 then proceed to record and analyze the camera output. A landing area clear status can be determined by examining the landing area and determining the landing area is clear of obstructions. Additionally, a landing area obstruction status can be obtained by determining that there is an obstruction in the landing area. A monitoring area may be selected that includes the landing area. Alternatively, the monitoring area may simply include a portion of the landing area.

The method 150 may then proceed to block 156 where the velocity processing module may process data from radar component 126. The operations associated with radar processing at block 156 may occur independently of the video processing operations at block 154. The operations at block 154 and 156 may also occur in parallel. Additionally, even though the jump safety system 100 may be configured to perform both monitoring of landing area and communicating optimal jump velocity, there may be instances when either video processing 156 or video processing 154 is interrupted by weather, loss of power, improper set-up, or other such factors that may affect operation of jump safety system 100.

In the illustrative method 150, the radar processing 156 includes positioning a means for determining velocity, e.g. radar component 126, along a path that is associated with the jump. The radar processing operations 156 may also include selecting an optimal velocity range for the landing area and recording a velocity output. In operation, the velocity output is analyzed and either a decrease velocity status, an increase velocity status, or a maintain velocity status is obtained. The increase velocity status is determined by having the velocity output exceed the optimal velocity range. The decrease velocity status is determined by having the velocity output below the optimal velocity range. The maintain velocity status is determined by having the velocity output within the optimal range.

The method then proceeds to block 158 where a light emitting output, e.g. display, communicates either a landing area status, or a jump velocity status, or a combination thereof. The landing area status and/or jump velocity status is communicated on a real-time basis as described herein. Thus, with respect to the landing area status, either the landing clear status or the landing area obstruction status is communicated to the light emitting output 124 at block 158. With respect to the jump velocity status, either the increase velocity status, the decrease velocity status, or the maintain velocity status is communicated to the light emitting output 132 at block 158.

In yet another embodiment, the logic associated with the landing area status and jump velocity status may be communicated to an integrated, i.e. single, light emitting output (not shown). This integrated light emitting output may also include a "caution" signal, e.g. orange output, that communicates that a clear reading has not been obtained.

Figure 5:
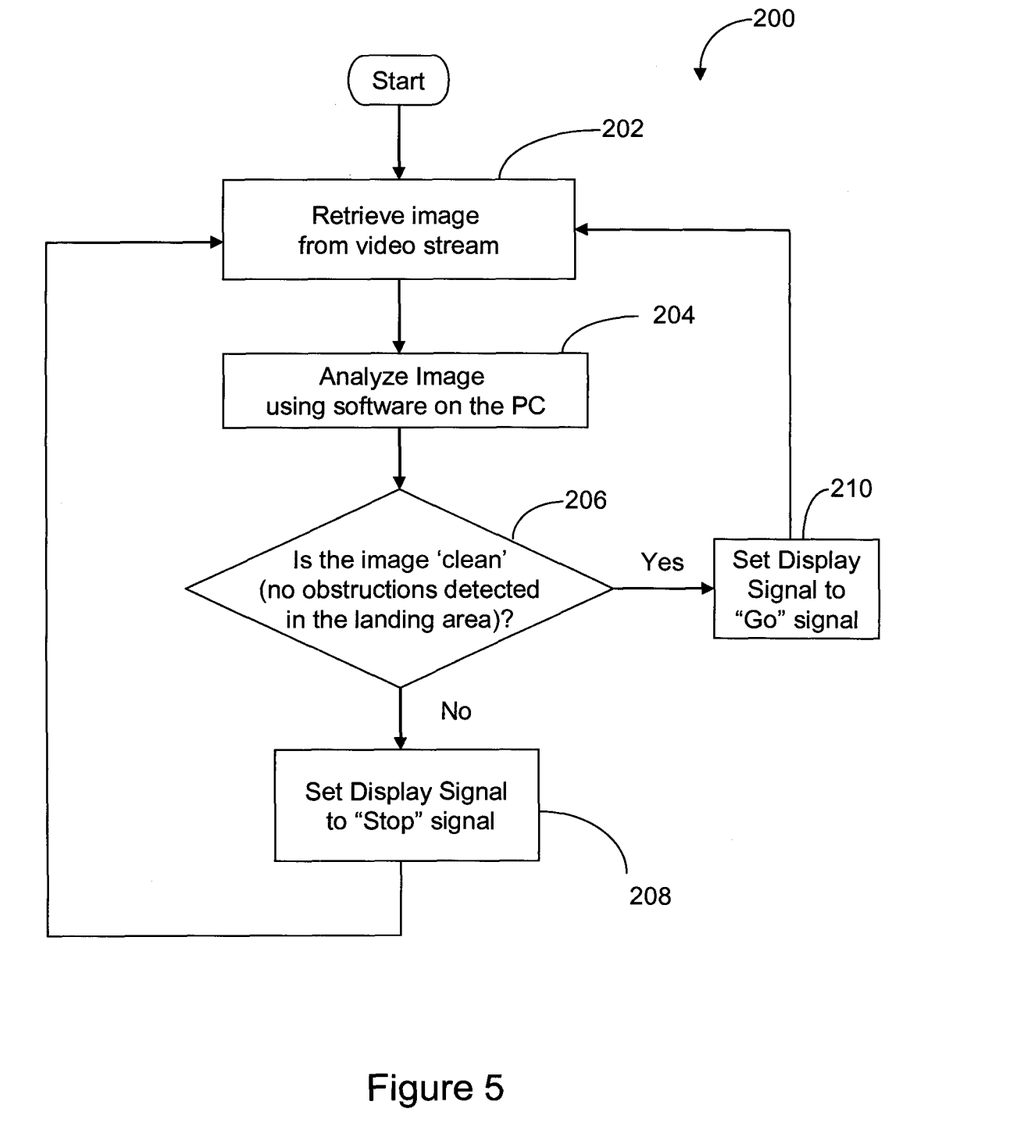
FIG. 5 presents a flow chart of an illustrative method for monitoring a landing area associated with a jump.

Referring to FIG. 5 and FIG. 4, there is shown a flow chart of an illustrative method 200 for monitoring a landing area associated with a jump. By way of example and not of limitation, the illustrative method 200 corresponds to the video processing operations in block 154. The illustrative method is initiated at block 202 where one or more images are retrieved from the video stream captured from camera 102. Generally, these images are captured for a particular period of time and the images are analyzed for changes at block 204 where an illustrative video image is analyzed by the microprocessor 108 using the image processing module 110.

The method then proceeds to decision diamond 206 where a determination is made whether the image is free of obstructions in landing area 20, i.e. clean image, or whether there are obstruction in the monitored landing area, i.e. dirty image. The dirty image is associated with the landing area obstruction status. The clean image is associated with the landing clear status described above. If the determination is made that there are obstructions, the method proceeds to block 208 where the light emitting output 124 communicates an illustrative "Stop" signal with an illustrative red light.

If the decision at diamond 206 is that there are no obstructions, e.g. clean images have been captured for an illustrative 10-second period, then the method proceeds to block 210 where the light emitting output 124 communicates an illustrative "Go" signal with an illustrative green light. In either case, after step 208 or step 210, the process is repeated and method returns to block 202. In the preferred embodiment, the steps performed in method 200 are performed on a real-time or pseudo real-time basis.

Figure 6:
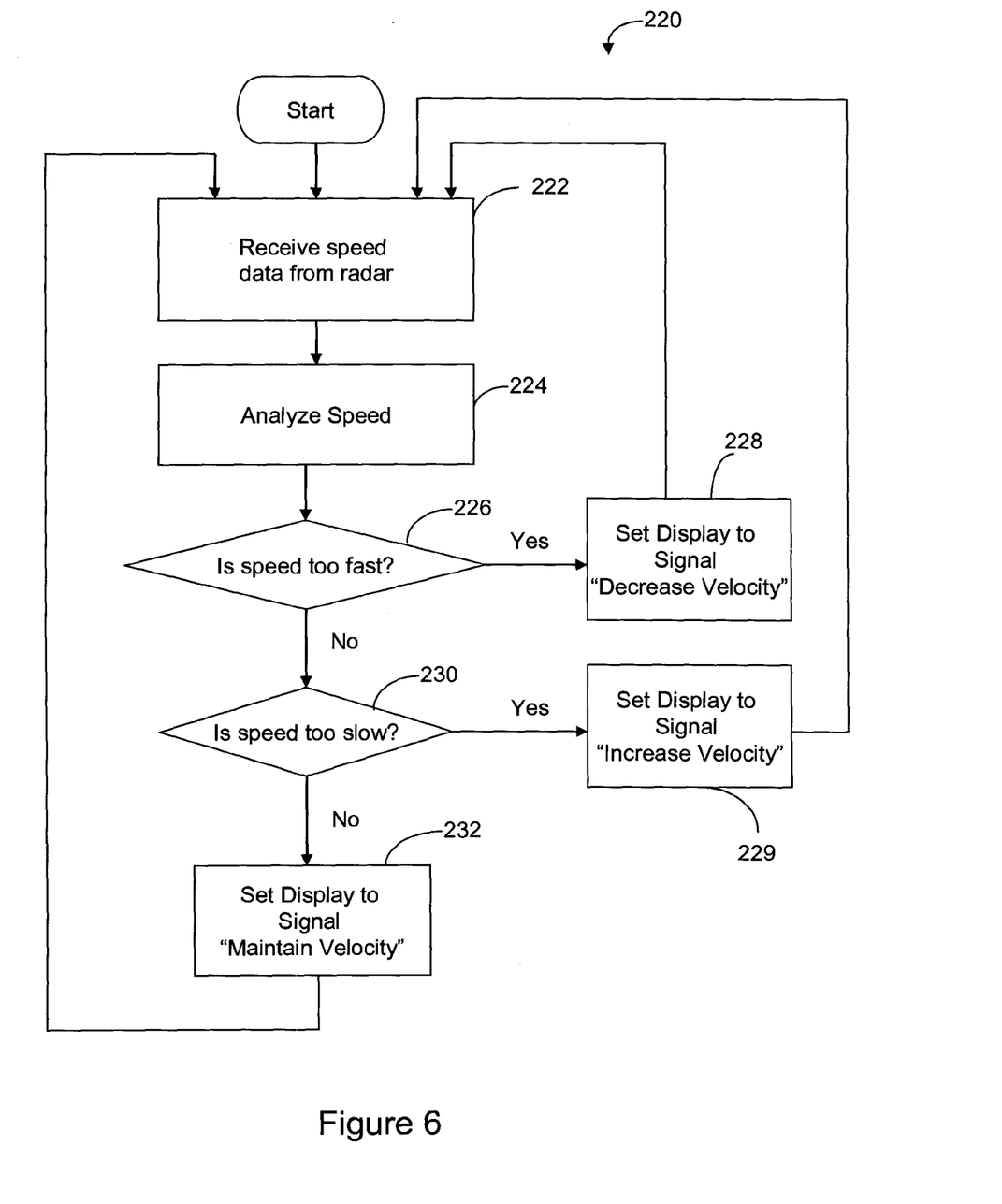
FIG. 6 presents a flow chart of an illustrative method for monitoring jump velocity associated with a jump.

Referring to now to FIG. 6, there is shown a flow chart of an illustrative method 220 for monitoring jump velocity. The illustrative method 220 is associated with the operations referred to in radar processing block 156 presented in FIG. 4. The illustrative method 220 is initiated at block 222 where speed data from an illustrative radar component 126, e.g. a radar gun, is communicated to the microprocessor 108. The method then proceeds to block 224 where the radar data is analyzed. Alternatively, another means for determining velocity may be employed such as a second camera (not shown) that can be used to determine rider velocity along a path leading up to the jump.

The method then proceeds to decision diamond 226 where a determination is made whether the rider's speed is above the upper bound of the optimal range. Note, the term "speed" is used interchangeably with "velocity," even though velocity is typically associated with a vector space and speed is not associated with a vector. If the rider's speed exceeds the upper bound of the optimal velocity, the method continues to block 228 where the light emitting output 132 communicates a decrease velocity signal, such as a downward arrow or other signal as discussed above.

The method 220 then proceeds to decision diamond 230 where a determination is made if the rider's speed is below the lower bound of the optimal range. If the rider's speed is below lower bound of the optimal range, the method continues to block 229 where the light emitting output 132 communicates the increase velocity signal, such as an upward arrow or other signal as discussed above.

If the rider's speed is within the optimal range, the process continues to block 232 where the light emitting output 132 communicates a maintain velocity status, such as an equal sign or other signal as discussed above.

It is to be understood that the foregoing is a detailed description of illustrative embodiments. The scope of the claims is not limited to these specific embodiments or examples. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A jump safety system for communicating an optimal velocity for a jump, the system comprising:
    a portable integrated housing configured to be positioned in a fixed location;
    a radar component coupled to the integrated housing that is positioned in the fixed location, the radar component configured to transmit and receive radio signals and generate a velocity output, the radar component positioned to determine the velocity output along a jump path that leads up to the jump; and
    a computer housing coupled to the portable integrated housing that is positioned in the fixed location, the computer housing includes,
        a memory that records the velocity output,
        a processor configured to analyze the velocity output,
        a velocity processing module controlled by the processor that determines an optimal velocity range for a landing area associated with the jump path, in which the landing area has a declining sloped angle,
        a velocity measurement that compares the velocity output to the optimal velocity range for the landing area, and
        a light emitting component coupled to the computer housing, the light emitting component configured to communicate the velocity measurement.

2. The jump safety system of claim 1, wherein the velocity measurement further comprises,
    an increase velocity status determined by the velocity processing module having the velocity output below the optimal velocity range,
    a decrease velocity status determined by the velocity processing module having the velocity output above the optimal velocity range, and
    a maintain velocity status determined by the velocity processing module having the velocity output within the optimal velocity range.

3. The jump safety system of claim 1, wherein the velocity measurement further comprises a velocity output communicated by the light emitting component.

4. The jump safety system of claim 1, wherein the velocity measurement further comprises,
    a velocity output communicated by the light emitting component,
    an increase velocity status determined by the velocity processing module having the velocity output below the optimal velocity range,
    a decrease velocity status determined by the velocity processing module having the velocity output above the optimal velocity range, and
    a maintain velocity status determined by the velocity processing module having the velocity output within the optimal velocity range.

5. The system of claim 1 further comprising a local power supply that delivers power to the radar component, the memory, the processor, the velocity processing module and the light emitting component.

6. The system of claim 5 wherein the local power supply comprises a solar cell.

7. The system of claim 6 wherein the local power supply comprises a battery.

8. The system of claim 1 further comprising,
    a camera positioned to generate a camera output that displays the landing area, an image processing module controlled by the processor that determines a landing area clear status by analyzing the camera output; and a landing area obstruction status determined by the image processing module analyzing the camera output.

9. The system of claim 8 wherein the light emitting output communicates at least one of the landing area clear status and the landing area obstruction status.

10. A jump safety system for communicating an optimal velocity for a jump, the system comprising:

a portable integrated housing configured to be positioned in a fixed location;

a velocity processing module coupled to the integrated housing that is positioned in the fixed location, the velocity processing module configured to generate a velocity output that provides a velocity measurement along a jump path that leads up to the jump; and a computer housing coupled to the portable integrated housing that is positioned in the fixed location, the computer housing includes, a memory that records the velocity output;

a processor configured to analyze the velocity output;

a velocity processing module controlled by the processor that determines an optimal velocity range for a landing area associated with the jump path, in which the landing area has a declining sloped angle, and a means for communicating the velocity measurement.

11. The jump safety system of claim 10, wherein the velocity measurement further comprises, an increase velocity status determined by the velocity processing module having the velocity output below the optimal velocity range, a decrease velocity status determined by the velocity processing module having the velocity output above the optimal velocity range, and a maintain velocity status determined by the velocity processing module having the velocity output within the optimal velocity range.

12. The jump safety system of claim 10, wherein the velocity measurement further comprises a velocity output communicated by the light emitting component.

13. The jump safety system of claim 10, wherein the velocity measurement further comprises, a velocity output communicated by the light emitting component, an increase velocity status determined by the velocity processing module having the velocity output below the optimal velocity range, a decrease velocity status determined by the velocity processing module having the velocity output above the optimal velocity range, and a maintain velocity status determined by the velocity processing module having the velocity output within the optimal velocity range.

14. The system of claim 10 further comprising a local power supply that delivers power to the radar component, the memory, the processor, the velocity processing module and the light emitting component.

15. The system of claim 14 wherein the local power supply comprises a solar cell.

16. The system of claim 15 wherein the local power supply comprises a battery.

17. The system of claim 10 further comprising a camera positioned to generate a camera output that displays the landing area.

18. The system of claim 17 further comprising:

an image processing module controlled by the processor that determines a landing area clear status by analyzing the camera output; and a landing area obstruction status determined by the image processing module analyzing the camera output.

19. The system of claim 18 wherein the light emitting output communicates at least one of the landing area clear status and the landing area obstruction status.

20. A jump safety method for communicating an optimal velocity for a jump, the method comprising:

positioning a portable integrated housing in a fixed location;

positioning a velocity processing module that is coupled to the portable integrated hosing in the fixed location, the velocity processing module configured to generate a velocity output along a jump path that leads up to the jump;

selecting an optimal velocity range for a landing area, in which the landing area has a declining sloped angle;

recording a velocity output;

analyzing the velocity output;

determining an increase velocity status by having the velocity output below the optimal velocity range, determining a decrease velocity status by having the velocity output above the optimal velocity range, and determining a maintain velocity status by having the velocity output within the optimal velocity range.

21. The jump safety method of claim 20, wherein analyzing the velocity output further comprises communicating the velocity output with a light emitting component.

22. The method of claim 20 wherein the velocity means comprises a radar module that transmits and receives radio signals, the radar component positioned to determine velocity along the path associated with the jump.

23. The method of claim 20 wherein the velocity means comprises a first camera positioned to capture images along the path associated with the jump, the first camera component configured to determine velocity.

24. The method of claim 20 further comprising:

positioning a camera to display the landing area associated with the jump;

recording the camera output; and analyzing the camera output.

25. The method of claim 24 further comprising:

determining a landing area clear status by analyzing the camera output; and determining a landing area obstruction status by analyzing the camera output.

26. The method of claim 25 further comprising communicating at least one of the landing area clear status and the landing area obstruction status to the light emitting output.

* * * * *